United States Patent
Matskevich et al.

(10) Patent No.: US 9,606,839 B2
(45) Date of Patent: Mar. 28, 2017

(54) TASK DISTRIBUTION METHOD AND SYSTEM

(71) Applicant: ABBYY InfoPoisk LLC, Moscow (RU)

(72) Inventors: Stepan Matskevich, Moscow (RU); Tatiana Danielyan, Moscow (RU)

(73) Assignee: ABBYY InfoPoisk LLC (RU)

( * ) Notice: Subject to any disclaimer, the term of this patent is extended or adjusted under 35 U.S.C. 154(b) by 210 days.

(21) Appl. No.: 14/142,710

(22) Filed: Dec. 27, 2013

(65) Prior Publication Data

US 2014/0331233 A1    Nov. 6, 2014

(30) Foreign Application Priority Data

May 6, 2013    (RU) .................................. 2013120489

(51) Int. Cl.
*G06F 9/44*    (2006.01)
*G06F 9/50*    (2006.01)

(52) U.S. Cl.
CPC ...... *G06F 9/505* (2013.01); *G06F 2209/5011* (2013.01)

(58) Field of Classification Search
CPC ........ G06F 9/4881; G06F 9/50; G06F 9/5027; G06F 9/5066; G06F 9/4806; G06F 2209/501

See application file for complete search history.

(56) References Cited

U.S. PATENT DOCUMENTS

| 7,669,087 B1* | 2/2010 | Johnsen | G06F 11/008 714/13 |
| 8,205,205 B2* | 6/2012 | Franke | 718/103 |
| 2008/0229318 A1* | 9/2008 | Franke | G06F 9/5038 718/104 |
| 2008/0244588 A1* | 10/2008 | Leiserson | G06F 9/4881 718/102 |

(Continued)

OTHER PUBLICATIONS

G. Bell, D. Siewiorek et al.; A Comparison of List Schedules for Parallel Processing Systems; 1974 ACM; pp. 685-690; <http://dl.acm.org/citation.cfm?id=361619>.*

(Continued)

*Primary Examiner* — Thuy Dao
*Assistant Examiner* — Cuong V Luu
(74) *Attorney, Agent, or Firm* — Veronica Weinstein

(57) ABSTRACT

Systems and methods for task distribution are provided. A total number of available computing system's processing units is defined, where the total number of available processing units includes a set of regular processing units available for executing tasks and a set of processing units that constitute the reserve pool. Tasks are assigned to processing units. The number of processing units assigned to the next task in the queue is no more than the total number of processing units available at the time, multiplied by the availability ratio. Iterative assignment of processing units to tasks according to the method described is performed as long as there are idle processing units available for task execution, when no more processing units are available, the processing units from the reserve pool are assigned. As a result, the method allows processing units to be available for allocation to a new incoming task at any time.

20 Claims, 8 Drawing Sheets

(56) References Cited

U.S. PATENT DOCUMENTS

| | | | | |
|---|---|---|---|---|
| 2008/0276262 A1* | 11/2008 | Munshi | ............... | G06F 8/41 |
| | | | | 719/328 |
| 2010/0095302 A1* | 4/2010 | Kato | ............... | G06F 9/5066 |
| | | | | 718/104 |
| 2011/0161637 A1* | 6/2011 | Sihn et al. | ............... | 712/220 |
| 2011/0296212 A1* | 12/2011 | Elnozahy | ............ | G06F 1/3203 |
| | | | | 713/320 |
| 2012/0159501 A1* | 6/2012 | Lee | ............... | G06F 9/4881 |
| | | | | 718/103 |
| 2012/0297069 A1* | 11/2012 | Duchastel et al. | ............ | 709/226 |
| 2013/0318379 A1* | 11/2013 | Seshadri et al. | ............ | 713/320 |
| 2015/0121391 A1* | 4/2015 | Wang | ............... | G06F 9/4881 |
| | | | | 718/104 |

OTHER PUBLICATIONS

Daniel Paranhos da Silva et al.; Trading Cycles for Information: Using Replication to Schedule Bag-of-Tasks Applications on Computational Grids; 2003 Springer; pp. 169-180; <http://link.springer.com/chapter/10.1007%2F978-3-540-45209-6_26#page-1>.*

Haluk Topcuoglu et al.; Task Scheduling Algorithms for Heterogeneous Processors; 1999 IEEE; 12 pages; <http://ieeexplore.ieee.org/stamp/stamp.jsp?arnumber=765092>.*

Tao Yang et al.; DSC Scheduling Parallel Tasks on an Unbounded Number of Processors; 1994 IEEE; pp. 951-967; <http://ieeexplore.ieee.org/stamp/stamp.jsp?arnumber=308533>.*

Takanori Okuma et al.; Real-Time Task Scheduling for a Variable Voltage Processor; 1999 IEEE; 6 pages; <http://ieeexplore.ieee.org/stamp/stamp.jsp?arnumber=814256>.*

Henri Casanova; Simgrid a Toolkit for the Simulation of Application Scheduling; 2001 IEEE; pp. 430-437; <http://ieeexplore.ieee.org/stamp/stamp.jsp?arnumber=923223>.*

* cited by examiner

TASK DISTRIBUTION METHOD AND SYSTEM

CROSS-REFERENCE TO RELATED APPLICATIONS

This application claims priority under 35 U.S.C. 119 to Russian patent application 2013120489, filed May 6, 2013, the disclosure of which is incorporated herein by reference.

BACKGROUND

Currently, several task distribution models with varying complexity of distributed tasks in operating systems are known. FIFO (First In, First Out) is a distribution method, which presumes the distribution of CPU time in the order of task arrival. (See, en.wikipedia.org/wiki/FIFO). During the FIFO method, each task uses the CPU time until it is completed.

Another known distribution method is called round-robin (See, en.wikipedia.org/wiki/Round-robin_scheduling). In this method, the tasks are given CPU time in a cycling list where each task in the queue is given a quantum of CPU time according to its place in the queue. If a task is not completed within a given quantum of time, it is interrupted and the next task is processed during the next quantum of time. The CPU time is allocated again for further processing of the interrupted task depending on its position in the queue, and the process is repeated until the task is completed.

A distribution system can divide complex tasks into simpler subtasks. Tasks can be divided into a set of subtasks that are independent from each other and can be executed concurrently, without interaction or data exchange with each other, and in a random order. In this case, the subtasks can be executed concurrently and asynchronously, which significantly reduces the execution time of the main task. In other cases, certain subtasks may have independent parts that can be executed concurrently, while the subtasks are distributed so that they can be synchronized and interact to execute the required operations.

The limitation of these methods is that they do not take into consideration the tasks' priorities and the fact that the executed tasks may have different priorities. With these methods, the system cannot be dynamically adjusted according to different needs and strategies to process tasks with varying complexity and scope.

SUMMARY

An exemplary embodiment relates to a method for task distribution. The method includes determining a total number of a computing system's idle processing units available for provision to existing tasks, including a set of processing units that can be provided for executing regular tasks and a set of processing units that constitute a reserve pool. The method further includes selecting an availability ratio. The method further includes assigning, for each subsequent task in the queue, of a number of processing units depending on the number of idle processing units available for executing regular tasks, wherein the number of assigned processing units is not greater than the number of processing units available for executing regular tasks at the moment of time, multiplied by the availability ratio, and not less than one such processing unit. Where no idle processing units are available for executing regular tasks, a next task is assigned at least one processing unit from the reserve pool.

Another exemplary embodiments relates to a system comprising one or more data processors; and one or more storage devices storing instructions that, when executed by the one or more data processors, cause the one or more data processors to perform operations. The operations comprising determining a total number of a computing system's idle processing units available for provision to existing tasks, including a set of processing units that can be provided for executing regular tasks and a set of processing units that constitute a reserve pool. The operations further comprising selecting an availability ratio. The operations further comprising assigning, for each subsequent task in the queue, of a number of processing units depending on the number of idle processing units available for executing regular tasks, wherein the number of assigned processing units is not greater than the number of processing units available for executing regular tasks at the moment of time, multiplied by the availability ratio, and not less than one such processing unit. Where no idle processing units are available for executing regular tasks, a next task is assigned at least one processing unit from the reserve pool.

A computer readable storage medium having machine instructions stored therein, the instructions being executable by a processor to cause the processor to perform operations. The operations comprising determining a total number of a computing system's idle processing units available for provision to existing tasks, including a set of processing units that can be provided for executing regular tasks and a set of processing units that constitute a reserve pool. The operations further comprising selecting an availability ratio. The operations further comprising assigning, for each subsequent task in the queue, of a number of processing units depending on the number of idle processing units available for executing regular tasks, wherein the number of assigned processing units is not greater than the number of processing units available for executing regular tasks at the moment of time, multiplied by the availability ratio, and not less than one such processing unit. Where no idle processing units are available for executing regular tasks, a next task is assigned at least one processing unit from the reserve pool.

BRIEF DESCRIPTION OF DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Figure 1:
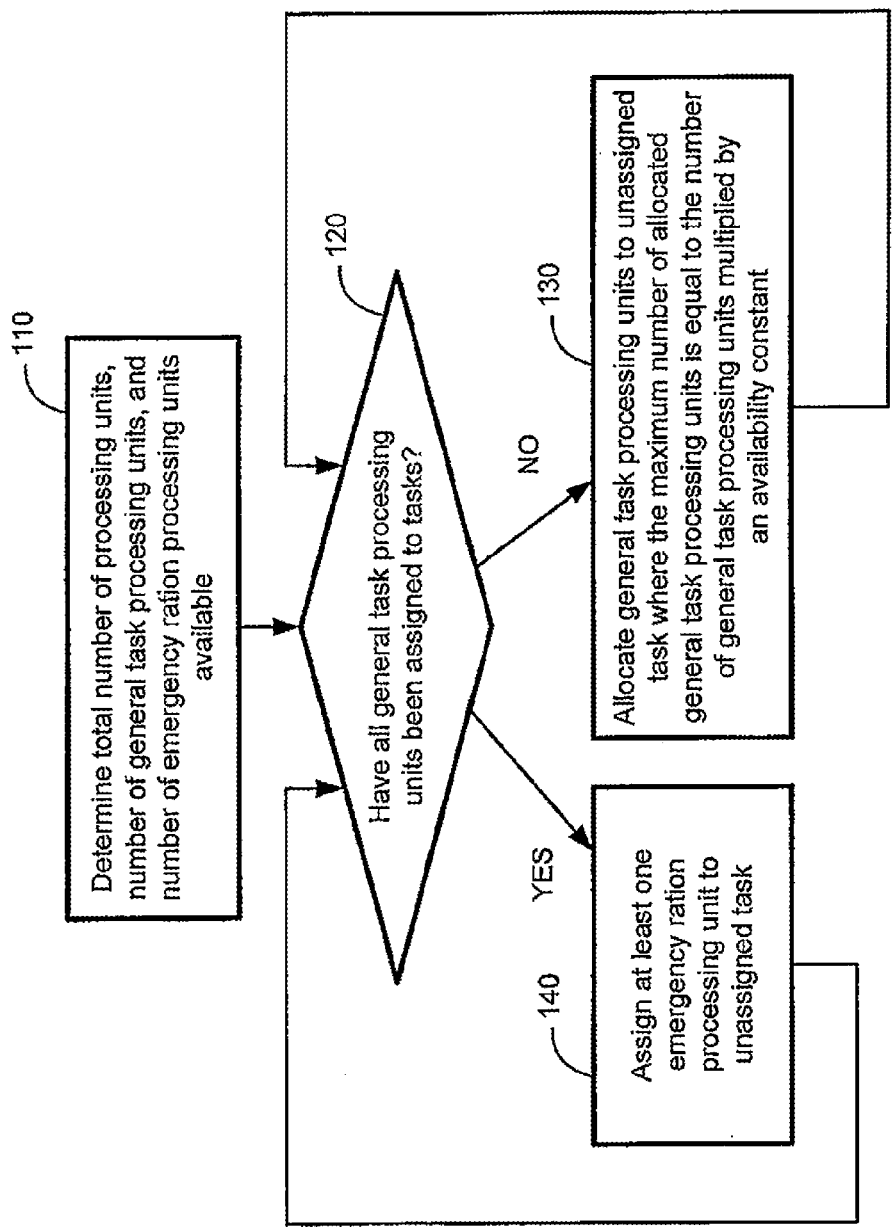
FIG. 1 is a flow chart of a task distribution method, in an accordance with an example implementation.

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

According to various embodiments disclosed herein, systems and methods are provided for performing task distribution and, in particular, resource assignment, through an operating system, to tasks and subtasks in systems with multiple computing elements or devices. The disclosed systems and methods provide a more effective and efficient solution to dynamically distribute an array of tasks with consideration of the executed tasks' priorities and complexity, as well as allow new tasks to be executed for processing at any time. These methods, data storage devices, and/or systems may be used by a computing system's server to distribute the tasks.

The task distribution method may define the total number of idle computing system's processing units available for existing task processing, including a set of processing units that can be provided for executing regular tasks and a set of processing units constituting a reserve pool. The task distribution method may select (once) an availability ratio. The task distribution method may assign each subsequent task in the queue a number of processing units depending on the number of idle processing units available for executing regular tasks, where the number of assigned processing units is not greater than the number of processing units available for executing regular tasks at the moment of time, multiplied by the availability ratio, and not less than one such processing unit. In case there are no idle processing units available for executing regular tasks, the next task is assigned at least one processing unit from the reserve pool.

In one embodiment, the task distribution process may include, in particular, additional identification of the total number of tasks to which no processing unit has been assigned. These tasks may be identified based on their priority and are subsequently assigned idle processing units available for executing regular tasks according to their priority. A set of processing units constituting the reserve pool can be expressed, for example, as a percentage of the total number of processing units. A number of processing units, from the set of processing units available for executing regular tasks, may be allocated for threading (PAT), with the total number of these processing units determined by the formula PAT=P−T−ER, where P is the total number of processing units available for executing regular tasks, T is the total number of distributed tasks, and ER is the number of processing units allocated to the reserve pool, wherein the ability to assign at least one additional processing unit for threading to each subsequent task in the queue is determined based on the task's complexity. The number of processing units (PUT) available for executing a complex task may be determined by the formula max (2, (PTT+1)*PTP), where PTT is the current number of processing units available for threading, and PTP is the percentage of processing units allowed for threading of this task. Iterative assignment of the processing units to the tasks at the moment of time may be based on the newly calculated number of processing units for the task, where the new number of processing units for this task (NPUT) is max (CPUT, min (PUT, CPUT+FAT, ST)), where CPUT is the number of processing units currently being used by this task; PUT is the number of processing units available for allocation to this task. FAT is a maximum number of idle processing units available for threading, where FAT=F−ER, where F is the total number of idle processing units at the moment of time; ER is the number of processing units allocated to the reserve pool. ST is the maximum number of processing units required to process this task.

In another embodiment, a machine-readable data storage device, containing instructions executed by a computer to provide the ability of task distribution among multiple computing devices, may include instructions configured to: define the total number of idle computing system's processing units available for processing existing tasks, including a set of processing units that can be provided for executing regular tasks and a set of processing units constituting the reserve pool. The instructions may be further configured to select the availability ratio once. The instructions may be further configured to assign, to each subsequent task in the queue, a number of processing units depending on the number of idle processing units available for executing regular tasks. The number of assigned processing units may not be greater than the number of processing units available for executing regular tasks at the moment of time, multiplied by the availability ratio, and not less than one such processing unit; in case there are no idle processing units available for executing regular tasks, the next task is assigned at least one processing unit from the reserve pool.

Preferred but not mandatory embodiments of the data storage device may include, in particular, additional instructions available for defining the total number of tasks to which no processing units have been assigned. These tasks may be identified based on their priority and are subsequently assigned idle processing units available for executing regular tasks according to their priority. The set of processing units constituting the reserve pool can be expressed, for example, as a percentage of the total number of processing units. The data storage device may contain an additional instruction that allocates, from a set of processing units available for executing regular tasks, a number of processing units available for threading (PAT), with the total number of these processing units determined by the formula PAT=P−T−ER, where P is the total number of processing units available for executing regular tasks, T is the total number of distributed tasks, and ER is the number of processing units allocated to the reserve pool; wherein the number of processing units (PUT) available for executing complex tasks is defined as max (2, (PTT+1)*PTP), where PTT is the current number of processing units available for threading, and PTP is the percentage of processing units allowed for threading of this task. There may be an ability of iterative assignment of processing units to tasks at the moment of time based on the newly calculated number of processing units for the task, where the new number of processing units for this task (NPUT) is max (CPUT, min (PUT, CPUT+FAT, ST)), where CPUT is the number of processing units being used by this task at the moment. PUT is the number of processing units available for allocation to this task. FAT is the maximum number of idle processing units available for threading, where FAT=F−ER, where F is the total number of idle processing units at the moment of time, ER is the number of processing units allocated to the reserve pool; and ST is the maximum number of processing units required to process this task.

A system of task distribution among multiple computing devices may include: one or more CPUs; one or more memory devices; program instructions for a computing device recorded to one or more memory devices which, when executed on one or more CPUs, manage the system to: define the total number of idle computing system's processing units available for processing existing tasks, including a set of processing units that can be provided for executing regular tasks and a set of processing units constituting the reserve pool; define the availability ratio once; assign, for each subsequent task in the queue, a number of processing units depending on the number of idle processing units available for executing regular tasks, wherein the number of assigned processing units is not greater than the number of processing units available for executing regular tasks at the moment of time, multiplied by the availability ratio, and not less than one such processing unit; in case there are no idle processing units available for executing regular tasks, at least one processing unit from the reserve pool is assigned to the next task.

Preferred but not mandatory embodiments of the system include, in particular, additional identification of the total number of tasks for which no processing unit has been assigned, wherein these tasks are identified based on their priority and are subsequently assigned idle processing units available for executing regular tasks according to their priority; the set of processing units constituting the reserve pool of the system can be expressed, for example, as a percentage of the total number of processing units; there is a possibility of additional allocation of processing units for threading (PAT) from the set of processing units available for executing regular tasks, where PAT is determined by the formula PAT=P−T−ER, where P is the total number of processing units available for executing regular tasks, T is the total number of distributed tasks, and ER is the number of processing units allocated to the reserve pool; wherein the number of processing units (PUT) available for executing complex tasks is max (2, (PTT+1)*PTP), where PTT is the number of processing units available for threading, and PTP is the percentage of processing units allowed for threading of this task; moreover, iterative assignment of processing units to the tasks at the moment of time is based on the newly calculated number of processing units for the task, where the new number of processing units for this task (NPUT) is max (CPUT, min (PUT, CPUT+FAT, ST)), where CPUT is the number of processing units being used by this task at the moment; PUT is the number of processing units available for allocation to this task; FAT is the maximum number of idle processing units available for threading, where FAT=F−ER, where F is the total number of idle processing units at the moment of time; ER is the number of processing units allocated to the reserve pool; and ST is the maximum number of processing units required to process this task.

The disclosed task distribution may be used in any computing device that is capable of receiving and processing both text data and image data. This may include servers, personal computers (PCs), notebooks, laptops, or any other existing computing devices, devices under development, or future computing devices that can be connected to a computer network. The preferred embodiment includes multi-processing unit devices that allow for more than one handling processing unit on the processing station immediately executing the task. Each processing unit can process only one task or its subtask at a time.

Various embodiments may include a task distribution system and a method that is executed on the components or elements of a computer system. Different examples and types of tasks that can be distributed and executed by the method include, but are not limited to, at least the following: text analysis and translation from one language to another, text corpora processing—analysis, statistical processing, statistical data collection, tagging, etc., as well as information extraction, speech recognition, etc. The described method of threading and task distribution is particularly useful for solving issues related to natural language processing, which can be quite complex and require significant computing resources.

FIG. 1 is a flow chart of a process for task distribution. As shown in FIG. 1, the described method includes the following steps: determination 110 (this step is also described in FIG. 3) of the total number of (idle) processing units of the computing device available for existing task processing, where the total number of available processing units includes a set of processing units that can be used to execute regular tasks and a set of processing units constituting a reserve pool. Processing units are assigned to tasks in the following way: the method is different in that the number of processing units assigned to the next task in the queue (step 130) is no greater than the number of processing units available at the moment, multiplied by an empirically selected availability ratio, and the iterative assignment of processing units to tasks in accordance with the described method proceeds as long as there are idle processing units available for executing the tasks (step 120), and when there are no such processing units, the next task is assigned to processing units from the reserve pool (step 140).

The specified task distribution method is operated in systems that allow multiprocessing. Distribution is executed according to the number of processing units available for distribution. This set consists of two groups: a set of processing units available for threading and a set of processing units constituting the reserve pool. The processing units from the first group are distributed according to the described method, which assigns the requested number of processing units up to the maximum available number of processing units in this group. This maximum number of processing units available for threading is equal to the number of idle processing units from the first group, multiplied by the availability ratio.

For example, the specified availability ratio can be dynamically adjusted with time, either manually or by software. The availability ratio value can be assigned randomly or selected empirically for any given system. For example, if the availability ratio is 0.5, then 50% of all the available processing units are allocated to the first task. If the availability ratio is set to a value greater than 0.5, earlier tasks receive more processing units, and therefore their degree of threading is higher, whereas later tasks may stay in the processing queue longer. If the availability ratio is set to a value less than 0.5, then more tasks are executed concurrently, but with a lower degree of threading.

Processing units are assigned to tasks according to the described method as long as there are idle processing units that can be allocated for task execution. When the processing units from the first group are exhausted, the processing units from the reserve pool are assigned.

In one instance, the tasks assigned to processing units from the reserve pool are simple and do not require threading. In this case, tasks for the processing units from the second group are distributed on a one task per one processing unit' basis. The second subset of CPUs from the second group makes it possible to add new tasks for processing even when all the processing units from the first group are busy. For example, if the system is processing many complex text processing tasks with a large volume of calculations that take up the whole set of processing units from the first group, just a few tasks take up all the resources, while all other users have to wait, even if their tasks require very few resources. The processing unit reserve pool allows users to include their tasks in the queue when all the processing units from the first group are busy, and thus, to get a sufficiently quick result. For relatively simple tasks, assigning a single processing unit can provide a relatively quick result.

Figure 2:
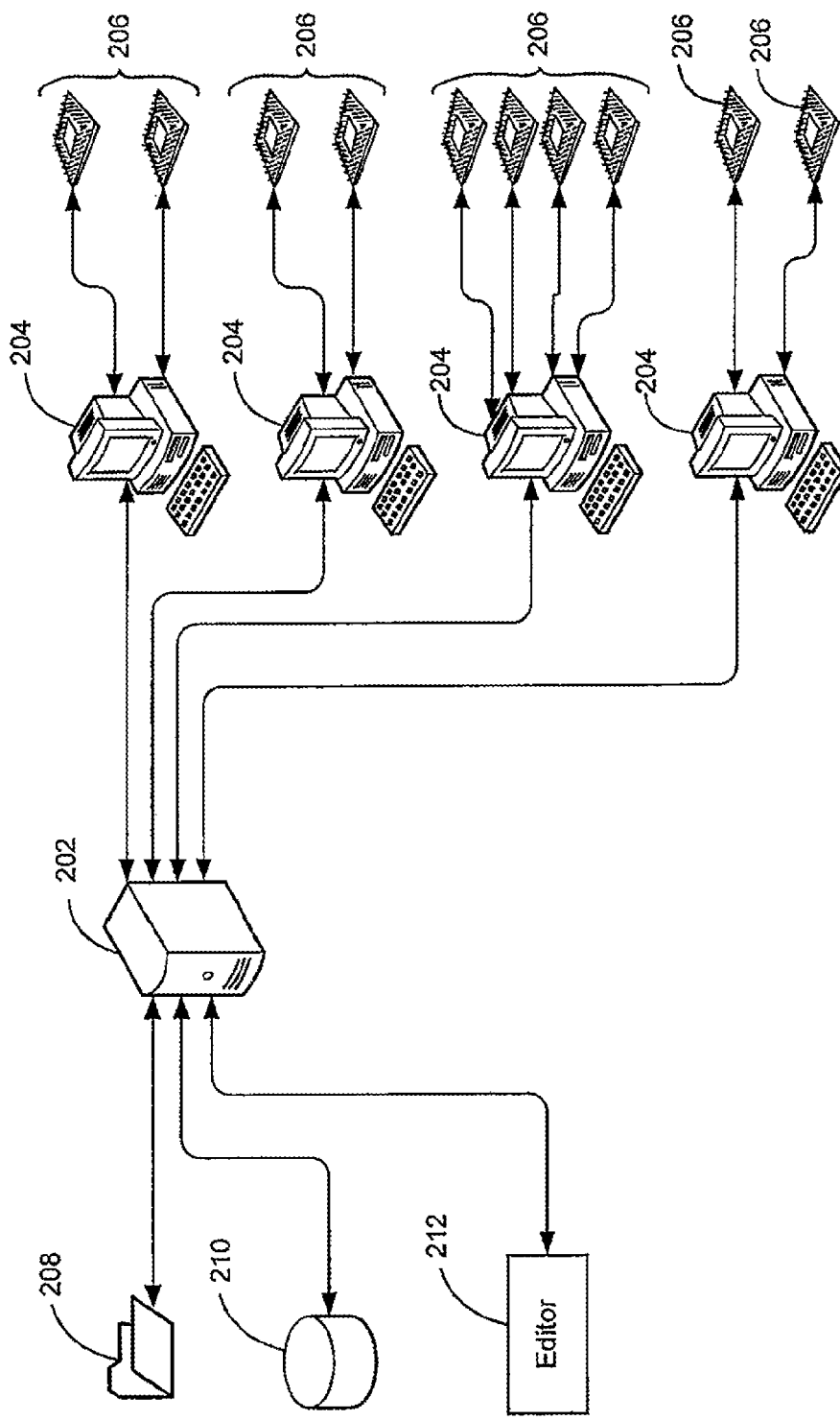
FIG. 2 illustrates a task distribution system, in an accordance with an example implementation.

An example of a computer system implementing task distribution according to the method shown in FIG. 2. The system of FIG. 2 is a client-server architecture. Server 202 is connected to a set of computing devices 204 (processing stations). Each of the computing devices 204 has at least one processing unit 206. Units 208, 210, and 212 are examples of clients of the server 202. Clients 208, 210, and 212 send tasks to the server for processing, where they can be distributed among processing units. For example, the client 208 is a folder of tasks waiting to be processed (hot folder) and a file distribution software application that manages task sending from the hot folder to the server. The method related to the hot folder enables each new task that comes into the hot folder to be processed or sent to the server 202. In another example, the client 212 can be an editor application operating a user interface for text translation on a remote terminal.

Hereinafter, a task is a simple (indivisible) task or a complex task together with the corresponding subtasks. The distribution (dispatching) system can divide each complex task into indivisible subtasks. A subtask is a processing unit for the server. For example, a processing unit can execute only one subtask at any time. When a set of processing units is assigned to a complex task, subtasks of this complex task are assigned to this set of processing units. Subtasks are rigidly bound or associated with their complex task. Complex tasks are placed into a processing queue. All subtasks of the complex task must use the processing units assigned to the corresponding complex task.

The number of available processing units for each task depends on, for example, (1) the total number of tasks with equal or higher priority; (2) the number of processing units used to execute higher priority tasks; (3) the number of processing units used to execute equal or higher priority tasks which were fed to the queue earlier. If the number of complex tasks is higher than the number of processing units, not more than one processing unit can be assigned to each complex task.

Assigning only one processing unit to a single complex task can save server CPU time. However, this saving is achieved due to lack of threading. If the number of tasks is fewer than the number of processing units, the earlier tasks are executed significantly faster than if the number of tasks is greater than the number of processing units.

An advantage of the described distribution method for natural language processing tasks is the ability to divide the processed text (whose volume can be quite high, making it a complex task) into multiple parts or subtasks. In one instance, the execution time for each complex task and its subtasks is not defined or can be measured immediately prior to initializing a task for execution only. In another instance, the number of subtasks of the complex task is defined immediately while it is being executed.

The described task distribution method allocates a set of idle processing units from those intended to be assigned to task execution and binds the idle processing units to subtasks. In one instance, the number of subtasks forming a complex task is defined at the very beginning of processing. For example, the maximum number of processing units available to process a complex task is the number of its subtasks—one processing unit per one subtask, and vice versa—one subtask per one processing unit. This distribution method is 'greedy' since it does not allocate all the idle processing units for executing one complex task.

The described distribution method can divide each task into parts or subtasks. The time required to execute each task and its subtasks is not defined before they are executed. For example, the method of dividing a task into subtasks and the subtasks' size can be standard or selected heuristically.

The objective of the described method is to distribute tasks and their subtasks in a computing system in such a way that any task, whether large or small, can return the task execution result in an expected period of time (an amount of time set depending on the situation). There can be different types of users, for example, those working in real time, users sending tasks through a website (portal), and the like. There can be priority levels assigned to each task, subtask or a parent task and one or more subtasks simultaneously. For some users, the execution time is insignificant—they can send their tasks in a package and the task execution time is not important to them.

Figure 3:
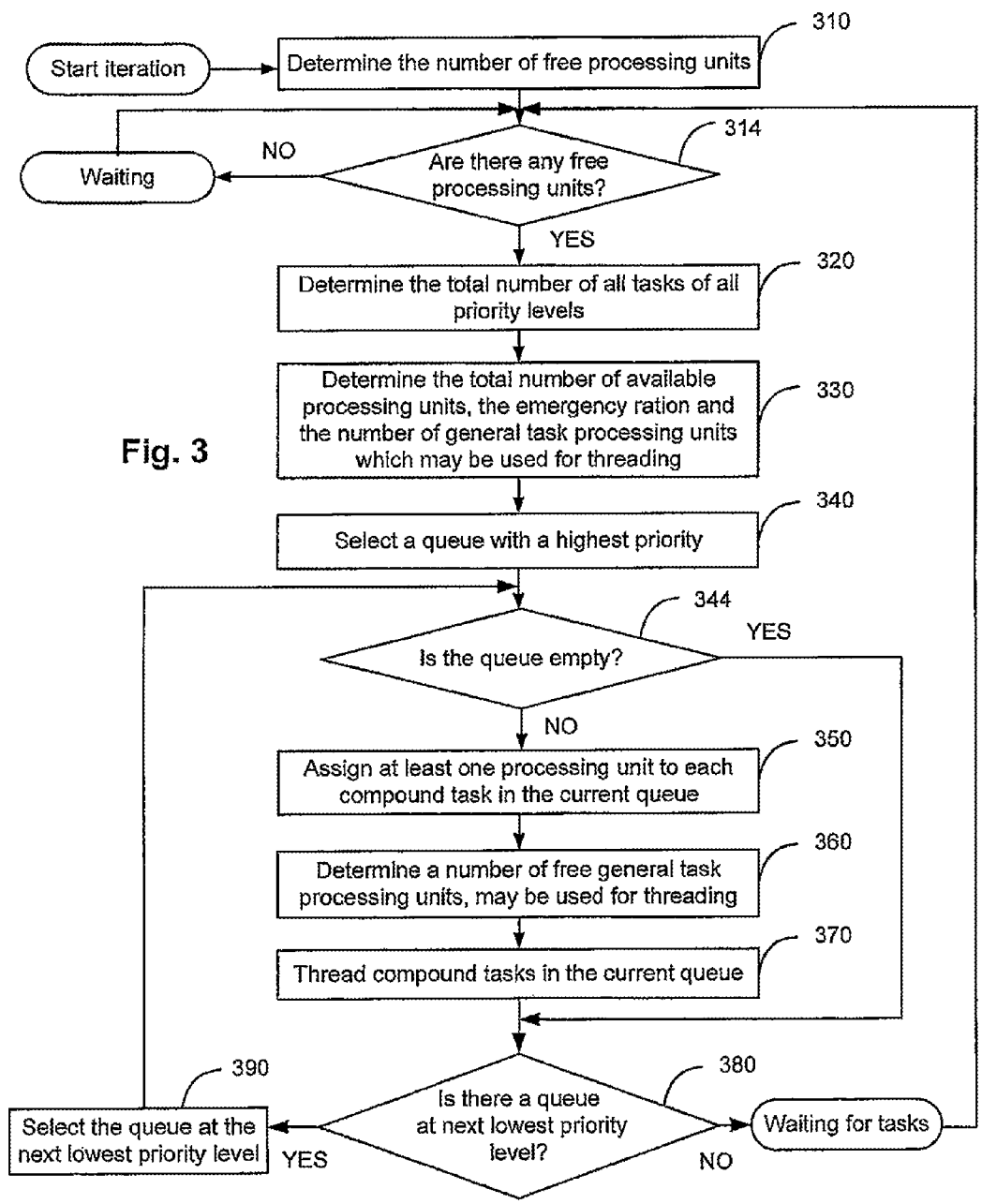
FIG. 3 is a flow chart of a task distribution process for task distribution that may be performed by a computing system's server, in an accordance with an example implementation.
Figure 4:
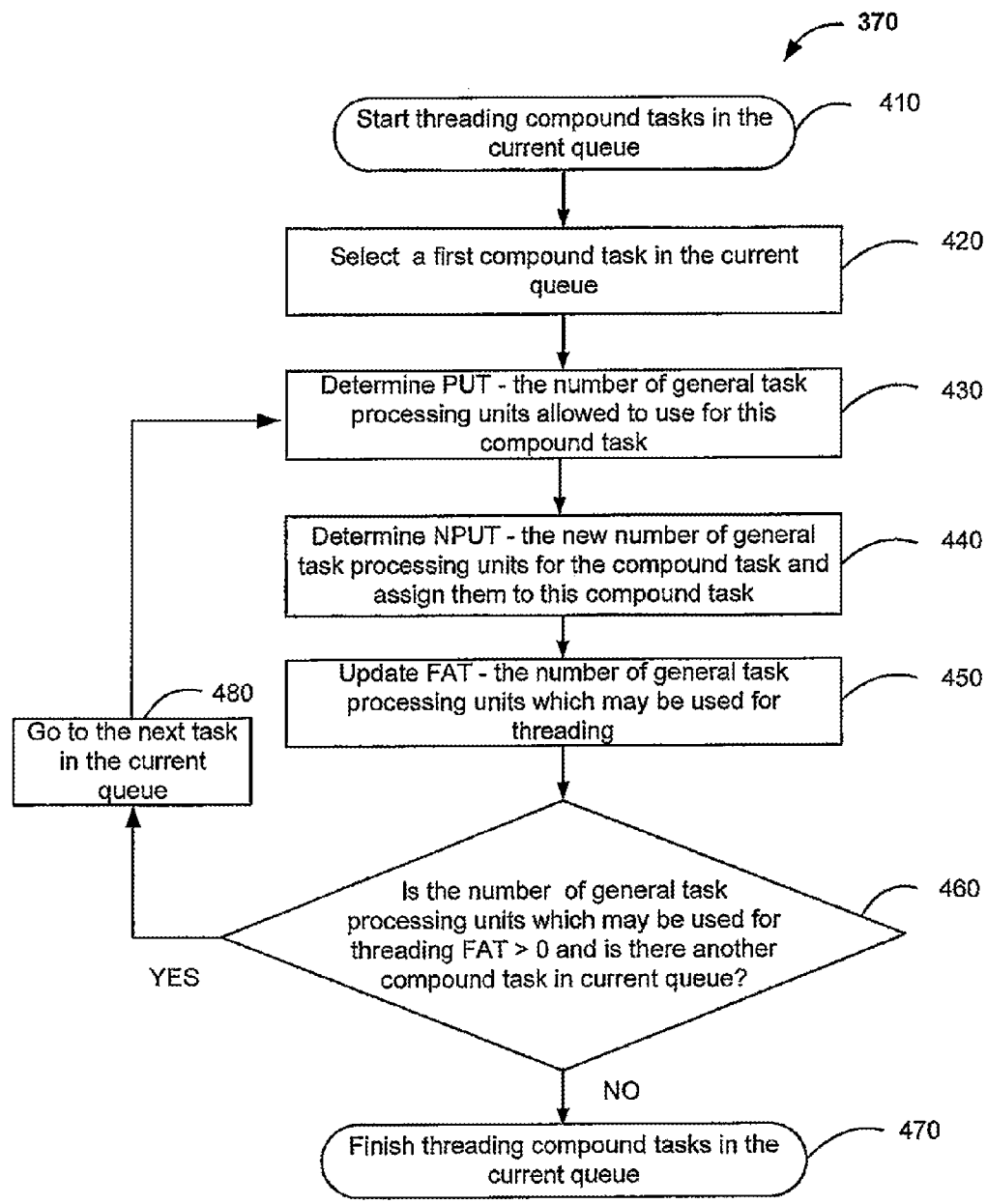
FIG. 4 is a flow chart of a process for arranging concurrent processing of tasks of equal priority, in an accordance with an example implementation.

FIG. 3 shows a flow chart of the described task distribution method used by the computing system's server. FIG. 4 shows a flow chart of the method for arranging the concurrent processing of equal priority tasks according to one embodiment. The method of described herein includes the steps shown in FIG. 3 and FIG. 4.

FIG. 3 shows the following steps of the method: calculating the number of idle processing units (310); determining the number of all undistributed complex tasks in all queues (320); determining the actual number of processing units that can be assigned to unexecuted tasks, the reserve pool (RP) and the number of processing units available for threading (330); selecting the queue with the highest priority (340); checking whether the queue with the highest priority is empty (344); depending on this, assigning at least one processing unit to each complex task in the current queue (350); recalculating the number of idle processing units available for threading (360), and threading the complex tasks from the current task queue (370).

Returning to FIG. 3, the number of idle processing units (310) at some moment of time can be shown using the F symbol. If after completing step 310 the number of idle processing units (F) is greater than zero (314), the total number of all tasks with all priorities (T) is calculated (step 320). Otherwise, the server waits for idle processing units to appear (for F to be greater than zero).

The number of complex tasks (T) in all queues with different priority levels is determined (step 320). After this, the number of processing units (P) available for task execution is calculated (step 330).

The number of processing units required for the task distribution system to be able to start processing a new task at any time is referred to herein as the reserve pool. In ONE embodiment, processing units from the reserve pool are not used for threading complex tasks. For example, there can be one or more processing units for creating the reserve pool. The reserve pool is a certain fixed proportion of the total number of processing units. As an example, the described task distribution system can require 10% (ERP=10%) to be available to start processing a new complex task.

The reserve pool can be described as ER=P*ERP, where ER is the number of processing units in the reserve pool, P is the total number of processing units in the system available for executing regular tasks, and ERP is a fixed proportion required to start processing a new task. The ERP value must not be too great since the system will not be able to thread the complex tasks and process them quickly enough.

After the reserve pool has been defined, the number of processing units allowed for threading the complex tasks (PAT, Processing units Available for Threading) is calculated. PAT can be represented by the formula PAT=P−T−ER, where P is the total number of processing units, T is the total number of tasks, and ER is the number of processing units in the reserve pool. Thus, each task receives at least one processing unit plus a certain number of processing units for threading.

Returning to FIG. 3, the queue with the highest priority is selected (step 340). For example, the queue can represent a list of equal priority tasks, shown in the order of arrival. A separate queue is created for each priority level. The distribution of complex tasks and subtasks among processing units in real time can be optimized according to the following criteria: (1) this method of complex task distribution makes it possible to start executing new tasks in the computing system as soon as possible; (2) complex tasks with high priority are processed first, followed by lower priority tasks; (3) the method can allocate several processing units to complex tasks consisting of several subtasks to execute them faster than when using one processing unit. Each complex task and its subtasks can have a certain priority level. Complex tasks in each queue are processed on a first come, first served basis for each priority level separately. For example, three priority levels can be set—low, medium, and high. For each priority level, complex tasks are processed in the same way. For example, the priority can be assigned to tasks a priori, before execution. Different complex tasks can be assigned different priority. For example, urgent tasks or tasks received from VIP clients can be assigned high priority. All tasks in the same queue have the same priority.

Tasks in the queue with the highest priority are processed first (steps 350, 370), so the queue with the highest priority is considered the current queue first. If the current queue is not empty, each complex task in the queue must be assigned at least one processing unit (step 350). Once the tasks from the current queue have been distributed to the designated processing units (350), the number of processing units available for threading is defined (360).

At step 310, the number of idle processing units (F) is defined. F is the maximum number of processing units available for assignment to tasks and their threading at the moment. Excluding the reserve pool (ER), the number of idle processing units available for threading (FAT, Free processing units Available for Threading) can be represented by the formula FAT=F−ER. Processing units from the reserve pool can be used only for assignment to new tasks, but not for threading.

If the number of idle processing units available for threading is greater than zero (FAT>0), and the total number of processing units allowed for threading is greater than zero (PAT>0), steps 430, 440, 450, and 460 are performed as represented in FIG. 4 for each task that requires threading. PTT is the current number of processing units available for current task threading (PTT, Processing units for Threading Task). For the first task, the number of processing units available for its threading (PTT) receives the PAT value, the number of processing units allowed for threading of the complex tasks.

FIG. 4 shows a flow chart of a process for current queue task threading (step 370). For example, let us assume that the highest priority task queue is not empty. At step 430, the number of processing units available for processing a complex task (PUT, Processing units for Use in Task processing) is calculated. The number of processing units available for processing a complex task PUT can be calculated using the formula PUT=max (2, (PTT+1)*PTP), where PTT is the current number of processing units available for threading, and PTP is a proportion of processing units allowed for threading of this task. According to the formula above, PUT equals the maximum of the values—(1) integer 2 or (2) rounded value (PTT+1), multiplied by PTP, where PTP is a proportion of processing units allowed for threading. If (PTT+1)*PTP is less than 2, then PUT=2 is selected. Since concurrent processing on one processing unit is impossible, the value 2 is used as the minimum necessary number of processing units for current task threading. PTP is a constant, representing a proportion of processing units allowed for threading of this task. For example, PTP can be set equal to the above-mentioned availability ratio and then processing units are allocated to tasks based on the PTP constant.

Returning to FIG. 1, regular processing units are provided for executing new tasks so that the maximum number of regular processing units assigned to task processing is equal to the number of available regular processing units assigned to task processing, multiplied by PTP.

For example, the value of the PTP constant may be set to 50% in the system. When a new task is fed to the distribution queue, approximately half (50%) of the obtainable processing units available for threading could be allocated to this new task. When a new task is fed to the queue (let us assume that none of the processing units have become idle), the PTP constant is used again, and 50% of the available processing units at the moment (50% of the remaining 50%) will be allocated to this next new task (approximately 25% of the initial number of processing units available at the moment of the first task's arrival, provided that none of the processing units have become idle).

A computing system with 100 processing units and one task queue may be provided. For example, ERP may have a value of 0, and PTP may have a value of 50%. The first task in the queue was very complex and required 50 processing units. This means that 50 processing units remained idle. Then, the next task that arrived in the queue required 25 processing units, and only 25 processing units remain available for the next task's distribution. If the third task that arrives to the queue requires 12 processing units, then 13 processing units will remain idle.

The default value of PTP can vary depending on the task distribution needs. For example, the PTP value can be set to 50%, and in another case, PTP can be 35%. Another advantage of the described distribution method is that in case there are several tasks with the same priority at the same time, the number of possible additional processing units for the second task is always less than the number of possible additional processing units for the first task (approximately (1−PTP)), multiplied by the number of remaining idle processing units after processing units have been allocated to the previous task.

Figure 5:
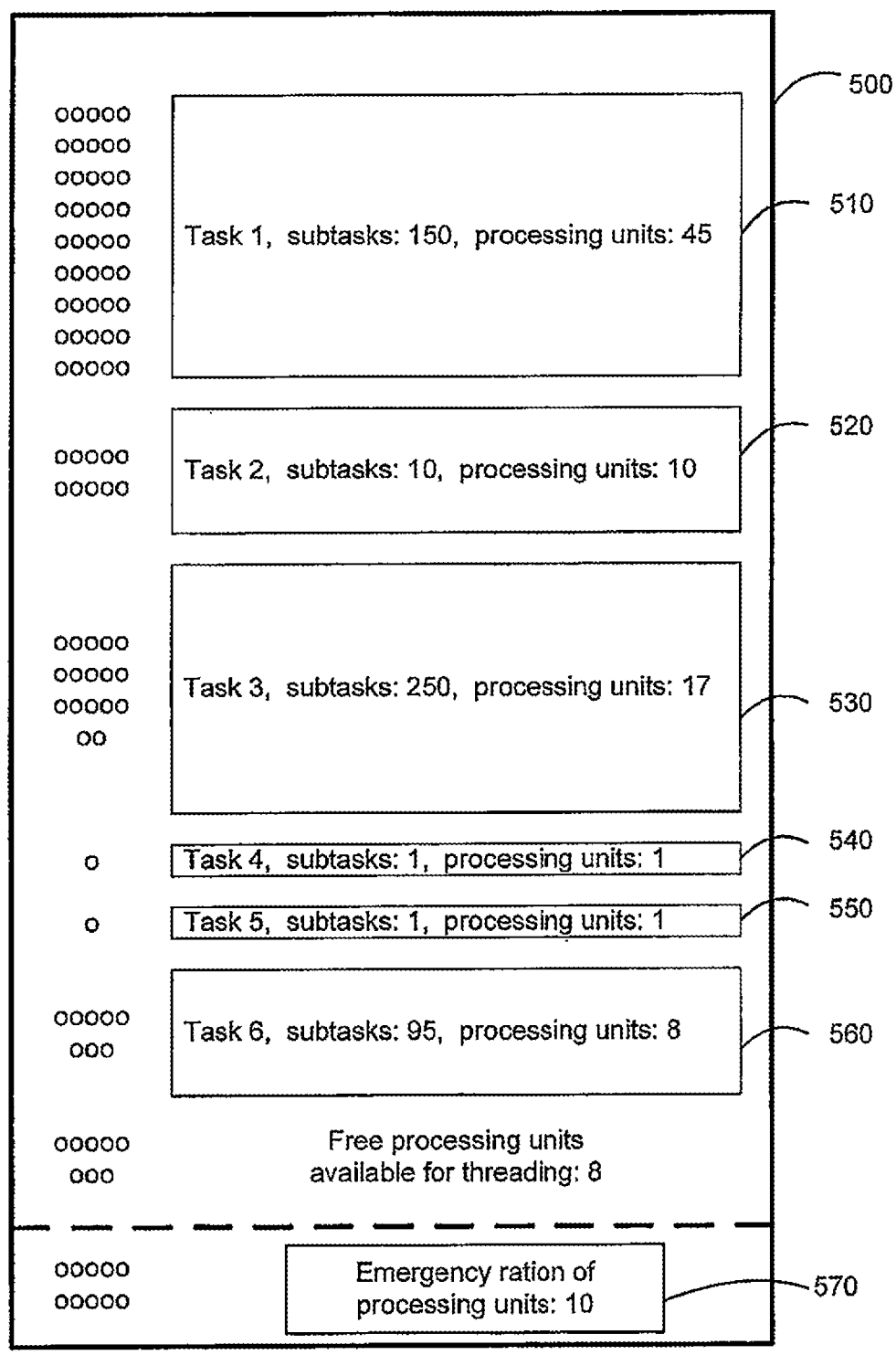
FIG. 5 illustrates an example of a task queue in a task distribution system, in an accordance with an example implementation.

FIG. 5 illustrates an example of a task queue in a task distribution. For example, FIG. 5 shows a queue of 500 tasks with the same priority. The tasks were fed to the queue in the following order: task 510, task 520, task 530, task 540, task 550, and task 560. FIG. 5 shows that, for example, task 1, shown as 510, is divided into 150 subtasks, task 520 is divided into 10 subtasks, task 530 is divided into 250 subtasks, tasks 540 and 550 are simple indivisible tasks, and task 560 is divided into 95 subtasks.

For example, the client-server system supports the task queue shown in FIG. 5 contains 100 processing units and has the values ERP=10% and PTP=50%. The processing units allocated to each task are shown in small circles in the left part of FIG. 500. The example in FIG. 5 shows that with the value ERP=10%, 10 processing units are reserved as the reserve pool 570, which means that 90 processing units remain available for task processing. Each task is assigned at least one processing unit. The described task distribution method allocates 45 processing units (90*50%) to the first task. Then, it assigns 10 processing units to the second task and 17 processing units (90−45−10)*50%) to the third task. Then, one processing unit is allocated to the fourth and fifth tasks. After that, 8 processing units ((90−45−10−17−1−1) *50%) are allocated to the sixth task. Eight processing units remain available for allocation to new tasks that may be fed into the queue. Eight processing units can be used both for executing sequential tasks and for threading them. To provide a more flexible approach to effective distribution, the ERP and PTP constants can be used to set up the server configuration. Different server operating modes can be accompanied by selecting the corresponding ERP and PTP and the corresponding computing system modules. For example, the values ERP=10%, PTP=50% correspond to the regular (default) mode in the previous example. In some cases, these values (ERP=10%, PTP=50%) correspond to the optimum distribution mode. The values ERP=0%, PTP=100% allow the provision of the maximum resources utilization mode for the first incoming task. Such values provide maximum threading (PTP=100% without the reserve pool (ERP=0)), which is effective for large tasks. For example, such a configuration can be used when the number of tasks is not large, for example, at night. The value ERP=100% is a mode that does not support threading. Only one processing unit is allocated to each task. This mode is acceptable in a situation when there are many small tasks (for example, multiple online users).

Figure 6:
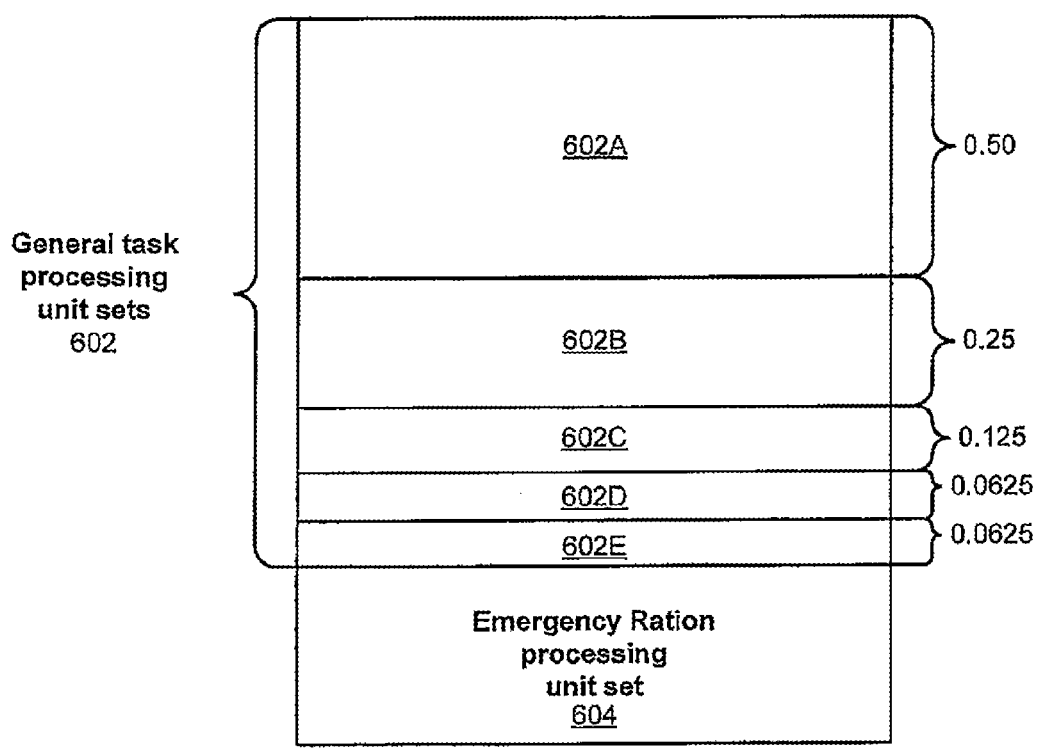
FIG. 6 illustrates distribution of processing units, in an accordance with an example implementation.

FIG. 6 illustrates the distribution of processing units if PTP=0.50 according to one embodiment. As shown above, processing units from the reserve pool are not assigned to tasks while there are idle regular processing units. Regular processing units are assigned according to the method that gives a requested number of processing units up to the maximum number of regular processing units. The maximum number of regular processing units is equal to the total number of available regular processing units, multiplied by the availability ratio.

When the availability ratio is 0.5 (PTP=0.50), 50% of the total number of available processing units is allocated to the first task.

Returning to the previous example shown in FIG. 5, this 0.50 set is marked as 602A. Processing units continue to be assigned to the next task. For the next task, the maximum proportion of processing units could be 50% of 50% of the regular processing units. This 0.25 distribution (0.5 multiplied by 0.5) is shown as 602B. Then, if there are idle processing units, they continue to be distributed, and 50% of 50% of 50% of the available processing units is provided for the next task. This 0.125 distribution shown in FIG. 6 follows the general formula $(1-PTP)^n$, where n is an integer.

The distribution process continues, and 50% of 50% of 50% of 50% of the idle processing units is allocated to the next task. This 0.0625 distribution (602C, 602D) is shown in FIG. 6. Let us assume for example, that when the 0.0625 distribution is attained, only 2 regular processing units are idle, which is fewer than required for this current task. Then, the task will be distributed between these 2 processing units, and processing units from the reserve pool 604 will be assigned to the next task from the queue since processing units from the reserve pool 604 are allocated only when there are no idle regular processing units 602.

FIG. 4 shows a flow chart of the task threading method for tasks that have the same priority. For example, a task may require ST processing units (ST is the number of processing units required for a task and, for example, it can be equal to a number of subtasks), and CPUT may be the current number of processing units used by the current task (CPUT=Current Processing units Used for Task). If CPUT is smaller than ST, further threading is desirable.

FIG. 4 shows the step of determining the new number of processing units for the task (440). The new number of processing units available for executing the task, NPUT (New Processing units Used for Task) is determined as NPUT=max (CPUT, min (PUT, CPUT+FAT, ST)). According to the formula, the new number of processing units allocated to the task is calculated as the maximum value out of: (1) CPUT—the current number of processing units used by the current task at the moment $t_c$ or (2) the minimum of three values: PUT (the number of processing units available for allocation to this task), CPUT (the number of processing units used by the task at the moment)+FAT (the maximum number of idle processing units available for threading), and ST (the number of processing units required for this current task). Therefore, the determined new number of processing units for the task (NPUT) can be less than the number of processing units available for allocation to this task (PUT), but not less than what has been allocated to this task (CPUT).

After determining the number of processing units available for executing the task (440), F—the number of idle processing units, and FAT—the number of idle processing units available for threading (450) are updated. The new value may be determined by the formula FAT=FAT−(NPUT−CPUT), where FAT is the maximum number of idle processing units available for threading, NPUT is the new number of processing units that are used for executing this task, and CPUT is the old number of processing units that were used for executing this task. The PTT value may be updated by the formula PTT=PTT−(NPUT−1), where PTT is the current number of processing units available for threading, and NPUT is the new number of processing units that are used for executing the task.

After the number of processing units available for threading has been updated, a decision is made: if the number of idle processing units available for threading is greater than zero (FAT>0) (step 460); if FAT>0, the next task is threaded (step 380). Tasks are processed according to their priority level so that the tasks with higher priority are executed first. After all the tasks with high priority have been executed, tasks with normal priority are executed (steps 350-370 of the flow chart in FIG. 3) Similarly, after all the tasks with normal priority have been executed, tasks with low priority are executed according to the following scheme (steps 350-370).

To further increase the method's adaptability, the productivity of processing units can be considered. If a new processing unit is added to the computing system, its productivity is assessed. All the idle processing units are arranged by productivity in descending order. For each portion of text, the most productive processing unit distributed to this task is allocated every time.

An example of a complex task subject to threading is translating a text from one language into another language. If the text is rather large, it can be divided, conditionally speaking, into pages, so if a text is divided into pages, the task is divided into subtasks. The page size can be fixed or limited, for example, to 2,000 characters. The division can be done by chapters, sections, paragraphs or sentence boundaries.

The principle of division into subtasks can be different depending on the tasks to be processed. If the text consists of independent parts, for example, a collection of stories, the task should also be divided into independent parts according to the parts' boundaries. In other cases, when there are significant thematic relations between parts, some additional actions may be required to achieve a quality result.

In certain embodiments, in order to achieve a quality translation, the results of the translation of separate parts of the text, as well as words, statistics, and lexical choice results can be collected and taken into consideration. Different types of statistics, both a priori and those received during the translation, can be collected and taken into consideration. The collected statistics can be fed to the processing units and used by them when processing a certain task and its subtasks. After all the subtasks have been completed, their results are combined into a whole. Different types of statistics can also be used at this step to evaluate the result's quality and to correct possible mistakes.

For example, after processing a complex task, its processing unit can perform additional, finalizing operations. Among them, for the complex text translation task described above, additional analysis of the translated text is possible to match translated terms and possibly correct them. Such corrective operations can be performed quickly.

Figure 7:
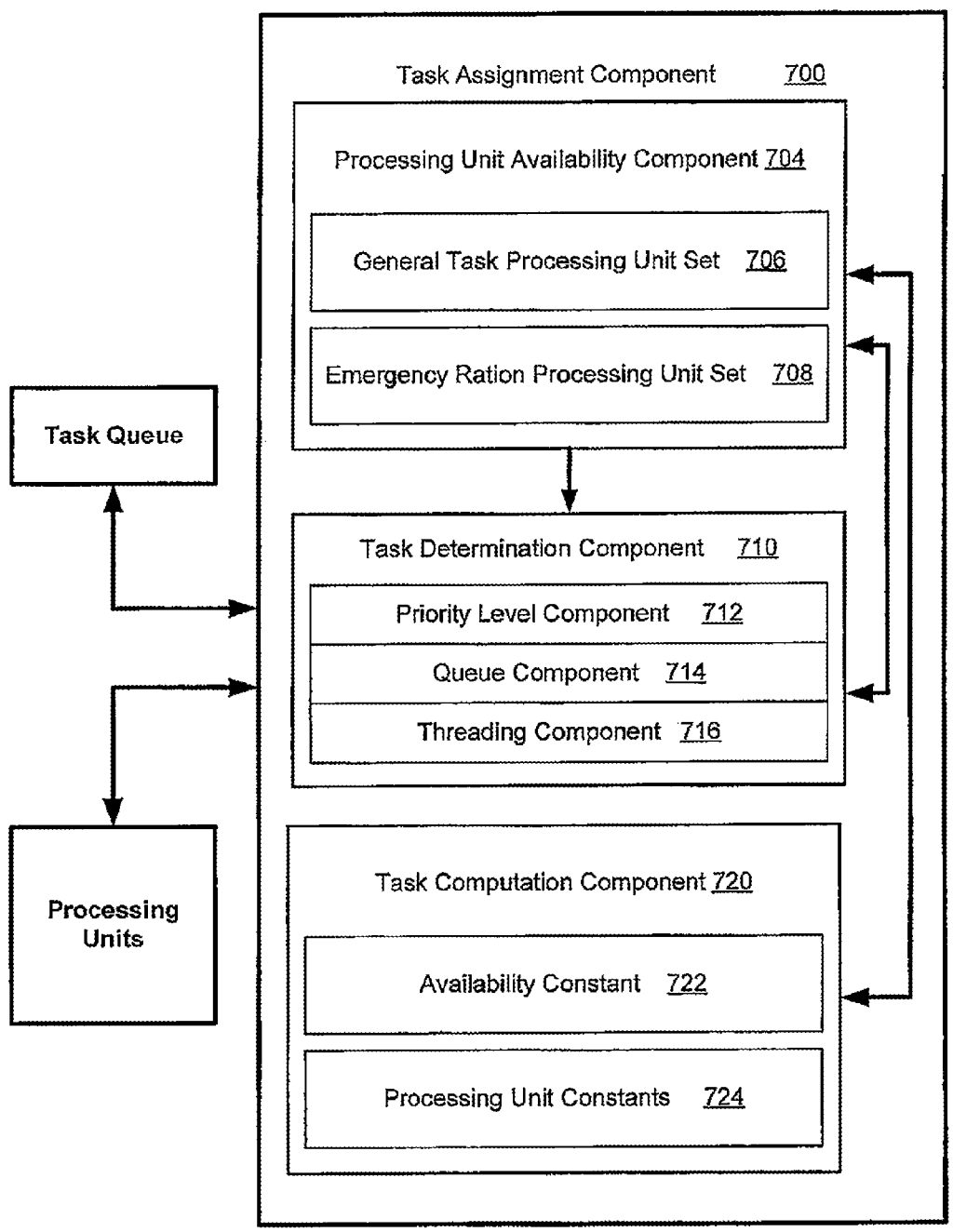
FIG. 7 illustrates a task distribution system diagram, in an accordance with an example implementation.

FIG. 7 illustrates a scheme of the task distribution system according to one embodiment. FIG. 7 shows a scheme of a system module responsible for assigning tasks from the queue to the current idle processing units. This task assignment module 700 includes the available processing units detection module 704, task serving module 710, and task calculating module 720.

The scheme shown in FIG. 7 illustrates an example of implementing the task distribution method shown in FIG. 1, FIG. 3, and FIG. 4. This method may be put into practice in 1) software, 2) hardware, or 3) a combination of software and hardware, which can be built-in or accessible to a server, processing units, or to a server and processing units combined. Thus, task assignment module 700 determines the next highest priority task in the queue and estimates the number of processing units required to execute this task. Besides, assignment module 700 determines the number of idle processing units and their types (regular or reserve pool). Based on the two types of available processing units, any task can be assigned to 1) no more than the existing number of available regular processing units, multiplied by the availability ratio, or 2) at least one processing unit from the reserve pool.

The task assignment module 700 shown in FIG. 7 includes the processing unit availability detection module 704, which determines the total number of idle processing units available for executing the tasks. For example, the total number of idle processing units may be determined at step 110. The total number of idle processing units is determined as the number of idle processing units from the set of regular processing units 706 and the set of reserve pool processing units 708.

The current task determination module 710 accumulates information about the current task to be executed. For example, the task determination module 710 may include the priority level module 712, queue module 714, and threading module 716. For example, the priority level module 712 may determine the priority of the current task, the queue module 714 may determine the position of the task in the queue, and the threading module 716 determines whether the task is threaded, and if it is, the conditions of its threading (for example, threading to 4 subtasks for 4 processing units).

For example, the task service module 710 tracks the number of tasks and the way they are distributed among the processing units, and stores the information about which task is assigned to which processing unit. For example, the task determination module may determine, based on the information received from the available processing units detection module 704, whether all the regular processing units are distributed (step 120). If not all the regular processing units are distributed, they may be assigned according to the method of the invention. If all the regular processing units have been distributed, the reserve pool processing units are distributed (step 140).

The task execution module 720 performs actions required for task distribution. It stores the value of the availability ratio (ERP) 722 and the number of processing units ratio (PTP) 724, which are used to determine the number of processing units required for task distribution. For example, the tasks are assigned to a set of processing units, where the number of assigned processing units is equal to the number of idle regular processing units, multiplied by the availability ratio.

The invention is configured for use in any computing device capable of receiving and processing both text data and image data. These devices may include servers, personal computers (PC), portable computers (notebooks, netbooks), compact computers (laptops), as well as any other existing, designed, or future computing devices.

Figure 8:
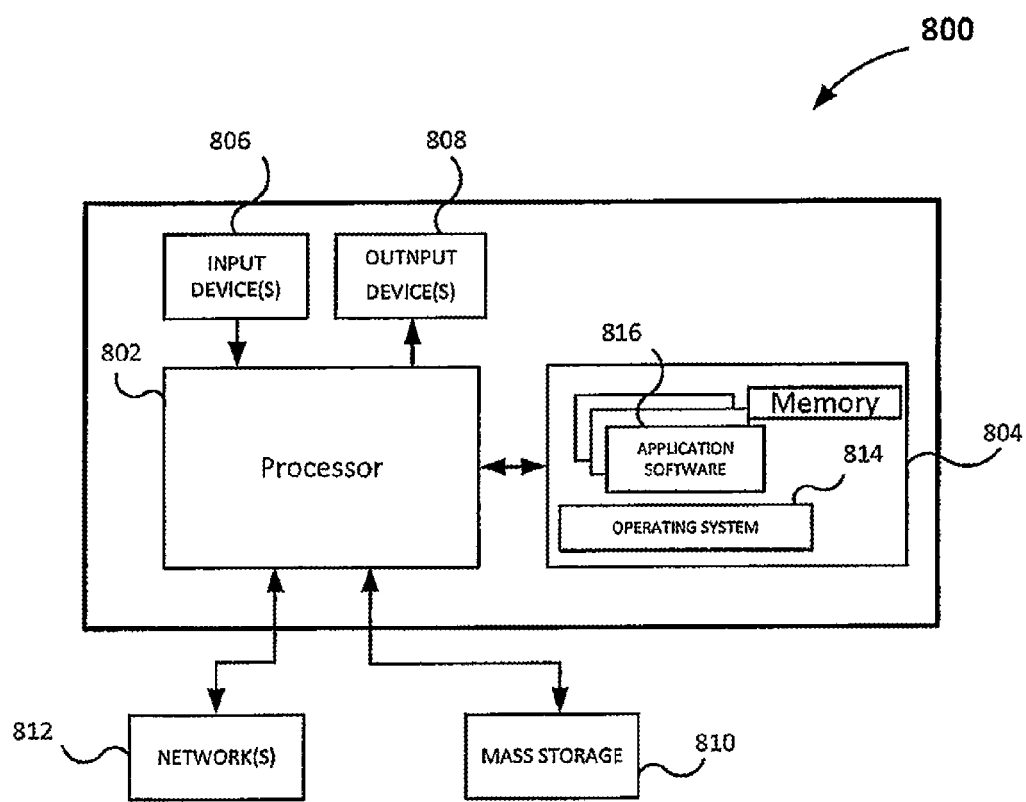
FIG. 8 illustrates an example of a computing device, in an accordance with an example implementation.

FIG. 8 shows an example of a computing device 800 available to implement the invention embodied as described above. The computing device 800 includes at least one CPU 802 connected to the memory 804. The CPU 802 may be one or more CPUs and may contain one, two, or more computing cores. The memory 804 may be a random access memory (RAM) or it may contain any other types of memory, including, in particular, non-volatile memory devices (for example, flash drives) and read-only memory (ROM) devices—for example, hard drives, etc. Furthermore, the memory 804 may be regarded as including data storage hardware physically located somewhere else in the computing device 800; for example, cache memory in the CPU 802, or memory used virtually and stored either on an internal or external ROM device 810.

The computing device 800 may have a certain number of inputs and outputs to transmit information outward and receive it from the outside. To provide a user interface, the computing device 800 may contain one or more input devices (for example, keyboard, mouse, scanner, etc.) and the display device 808 (for example, a liquid crystal display). The computing device 800 may also have one or more ROM devices 810, for example, an optical disk drive (CD, DVD, or other), hard drive, or tape drive. Besides, the computing device 800 may have an interface with one or more networks 812, providing a connection to other networks and computing devices. In particular, this may be a local area network (LAN) or a Wi-Fi network, either connected to the Internet or not. The computing device 800 is assumed to enable the appropriate analogue and/or digital interfaces between the CPU 802 and each of the components 804, 806, 808, 810, and 812. The computing device 800 operates under the operating system 814 and runs various applications, components, programs, objects, modules, etc., jointly shown as 816.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be deleted to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

The invention claimed is:

1. A method for task distribution, the method comprising:
   determining a total number of a computing system's idle processing units available to be provisioned to existing tasks, including a first set of idle processing units available for executing regular tasks and a second set of idle processing units that constitute a reserve pool;
   selecting an availability ratio, wherein the availability ratio is less than one;
   assigning, to a first task in a processing queue, a first number of processing units from the first set, wherein the first number of processing units assigned is not greater than a number of idle processing units in the first set multiplied by the availability ratio, and not less than one such processing unit;
   determining a remaining number of idle processing units in the first set; and
   assigning, to a second task in the processing queue, a second number of processing units from the first set, wherein the second number of processing units assigned is not greater than the remaining number of idle processing units in the first set multiplied by the availability ratio, and not less than one such processing unit,
   wherein when no remaining idle processing units in the first set are available for executing regular tasks, a next task is assigned at least one processing unit from the reserve pool.

2. The method of claim 1, wherein a total number of tasks to which no processing unit has been assigned is further defined, and wherein the tasks are chosen for processing according to their priority with the subsequent assignment of the first number of processing units according to their priority.

3. The method of claim 1, wherein a set of processing units available for threading (PAT) is further allocated from the first set of processing units available for executing regular tasks, and wherein a number of processing units in the set PAT is determined using a formula PAT=P−T−ER, where P is a total number of processing units available for executing regular tasks, T is a total number of distributed tasks, and ER is a number of processing units allocated to the reserve pool.

4. The method of claim 1, wherein the second set of processing units constituting the reserve pool has a fixed number of processing units.

5. The method of claim 3, wherein the number of processing units (PUT) available for executing a task is max (2, (PTT+1)*PTP), where PTT is a current number of processing units available for threading, and PTP is the percentage of processing units allowed for threading of the task.

6. The method of claim 5, wherein the iterative assignment of processing units to the tasks is based on calculation of new number of processing units, where the new number of processing units for the task (NPUT) is max (CPUT, min (PUT, CPUT+FAT, ST)), where CPUT is a number of processing units used by the task at the moment of time; PUT is a number of processing units available for allocation to the task, wherein FAT is a maximum number of idle processing units available for threading, where FAT=F−ER; F is a total number of idle processing units at the moment of time; ER is a number of processing units allocated to the reserve pool; and ST is a maximum number of processing units required to process the task.

7. The method of claim 1, wherein the reserve pool includes processing units not assigned to tasks when there are idle units in the set of processing units for executing regular tasks.

8. The method of claim 1, wherein a number of idle processing units in the first set that are available for executing regular tasks at a second time, subsequent to the first time, is based on a difference between the number of idle processing units in the first set that are available for executing regular tasks at the first time and the first number of processing units assigned for the first task.

9. A non-transitory computer-readable storage medium having machine instructions stored therein, the instructions being executable by a processor to cause the processor to perform operations comprising:
   determining a total number of a computing system's idle processing units available to be provisioned to existing tasks, including a first set of idle processing units available for executing regular tasks and a second set of idle processing units that constitute a reserve pool;

selecting an availability ratio, wherein the availability ratio is less than one;

assigning, to a first task in a processing queue, a first number of processing units from the first set, wherein the first number of processing units assigned is not greater than a number of idle processing units in the first set, multiplied by the availability ratio, and not less than one such processing unit;

determining a remaining number of idle processing units in the first set; and assigning, to a second task in the processing queue, a second number of processing units from the first set, wherein the second number of processing units assigned is not greater than the remaining number of idle processing units in the first set multiplied by the availability ratio, and not less than one such processing unit, wherein when no remaining idle processing units in the first set are available for executing regular tasks, a next task is assigned at least one processing unit from the reserve pool.

10. The non-transitory computer-readable storage medium of claim 9, operations further comprising determining a total number of tasks for which no processing units have been assigned, wherein tasks are chosen for processing according to their priority with the subsequent assignment of the first number of processing units according to their priority.

11. The non-transitory computer-readable storage medium of claim 9, operations further comprising allocating additional processing units for threading (PAT) from the first set of processing units available for executing regular tasks, and wherein a number of processing units in PAT is determined using the formula PAT=P−T−ER, where P is a total number of processing units available for executing regular tasks, T is a total number of distributed tasks, and ER is a number of processing units allocated to the reserve pool.

12. The non-transitory computer-readable storage medium of claim 9, wherein the second set of processing units constituting the reserve pool has a fixed number of processing units.

13. The non-transitory computer-readable storage medium of claim 11, wherein the number of processing units (PUT) available for executing complex tasks is max (2, (PTT+1)*PTP), where PTT is a current number of processing units available for threading, and PTP is a percentage of processing units allowed for threading of this task.

14. The non-transitory computer-readable storage medium of claim 13, wherein the iterative assignment of processing units to tasks at the moment of time is based on a calculation of a new amount of processing units, where the new amount of processing units for the task (NPUT) is max (CPUT, min (PUT, CPUT+FAT, ST)), where CPUT is a number of processing units used by this task at the moment of time; PUT is a number of processing units available for allocation to this task; FAT is a maximum number of idle processing units available for threading, where FAT=F−ER; F is a total number of idle processing units at the moment of time; ER is a number of processing units allocated to the reserve pool; and ST is a maximum number of processing units required to process this task.

15. A system for task distribution among a set of computing devices, including:

one or more data processors; and one or more storage devices storing instructions that, when executed by the one or more data processors, cause the one or more data processors to perform operations comprising:

determining a total number of a computing system's idle processing units available to be provisioned to existing tasks, including a first set of idle processing units available for executing regular tasks and a second set of idle processing units that constitute a reserve pool;

selecting an availability ratio, wherein the availability ratio is less than one;

assigning, to a first task in a processing queue, a first number of processing units from the first set, wherein the first number of processing units assigned is not greater than a number of idle processing units in the first set, multiplied by the availability ratio, and not less than one such processing unit;

determining a remaining number of idle processing units in the first set; and assigning, to a second task in the processing queue, a second number of processing units from the first set, wherein the second number of processing units assigned is not greater than the remaining number of idle processing units in the first set multiplied by the availability ratio, and not less than one such processing unit, wherein when no remaining idle processing units in the first set are available for executing regular tasks, a next task is assigned at least one processing unit from the reserve pool.

16. The system of claim 15, wherein a total number of tasks to which no processing unit has been assigned is further determined, and wherein the tasks are chosen for processing according to their priority with the subsequent assignment of the first number of processing units according to their priority.

17. The system of claim 15, wherein additional processing units for threading (PAT) are allocated from the first set of processing units available for executing regular tasks, and wherein a number of processing units in PAT is determined using the formula PAT=P−T−ER, where P is the total number of processing units available for executing regular tasks, T is the total number of distributed tasks, and ER is the number of processing units allocated to the reserve pool.

18. The system of claim 15, wherein the second set of processing units constituting the reserve pool has a fixed number of processing units.

19. The system of claim 17, wherein the number of processing units (PUT) available for executing complex tasks is max (2, (PTT+1)*PTP), where PTT is the current number of processing units available for threading, and PTP is the percentage of processing units allowed for threading of this task.

20. The system of claim 19, wherein the iterative assignment of processing units to tasks at the moment of time is based on a calculation of a new number of processing units, and wherein the new number of processing units for this task (NPUT) is max (CPUT, min (PUT, CPUT+FAT, ST)), where CPUT is a number of processing units used by this task at the moment; PUT is a number of processing units available for allocation to this task; FAT is a maximum number of idle processing units available for threading, where FAT=F−ER; where F is a total number of idle processing units at the moment of time; ER is a number of processing units allocated to the reserve pool; and ST is a maximum number of processing units required to process this task.

* * * * *